(12) United States Patent
Johnson et al.

(10) Patent No.: US 11,069,488 B2
(45) Date of Patent: Jul. 20, 2021

(54) HYBRID ENERGY STORAGE DEVICE

(71) Applicant: Systematic Power Solutions, LLC, Knoxville, TN (US)

(72) Inventors: Scottie Johnson, Knoxville, TN (US); Eric C Ricker, Knoxville, TN (US)

(73) Assignee: Systematic Power Solutions, LLC, Knoxville, TN (US)

(*) Notice: Subject to any disclaimer, the term of this patent is extended or adjusted under 35 U.S.C. 154(b) by 104 days.

(21) Appl. No.: 16/352,555

(22) Filed: Mar. 13, 2019

(65) Prior Publication Data

US 2020/0126735 A1 Apr. 23, 2020

Related U.S. Application Data

(60) Provisional application No. 62/753,241, filed on Oct. 31, 2018, provisional application No. 62/747,902, filed on Oct. 19, 2018.

(51) Int. Cl.
| | |
|---|---|
| *H01G 11/86* | (2013.01) |
| *H01G 9/00* | (2006.01) |
| *H01G 11/06* | (2013.01) |
| *H01M 10/0525* | (2010.01) |
| *H01M 50/543* | (2021.01) |

(52) U.S. Cl.
CPC ............ *H01G 11/86* (2013.01); *H01G 9/155* (2013.01); *H01G 11/06* (2013.01); *H01M 10/0525* (2013.01); *H01M 50/543* (2021.01)

(58) Field of Classification Search
CPC .... H02J 7/0045; H02J 7/00; H02J 7/14; H02J 7/345; H02J 7/0042; H01M 10/44; H01M 10/0525; H01M 2220/20; H01M 10/052; H01M 10/4264; H01M 50/543; H01M 10/48; H01M 2010/4278; H01M 10/425; H01M 16/003; H01G 11/86; H01G 9/155; H01G 11/06; H01G 11/74; H01G 11/82; H01G 11/10; H01G 11/08; Y02E 60/10; Y02E 60/50; Y02T 10/70
See application file for complete search history.

(56) References Cited

U.S. PATENT DOCUMENTS

| | | | |
|---|---|---|---|
| 6,765,312 | B1 | 7/2004 | Urlass et al. |
| 7,119,518 | B1 | 10/2006 | Dougherty et al. |
| 7,193,390 | B2 | 3/2007 | Nagai et al. |
| 7,362,005 | B2 | 4/2008 | Leblanc |
| 7,548,409 | B2 | 6/2009 | Kojima et al. |
| 7,667,432 | B2 | 2/2010 | West et al. |
| 7,887,943 | B2 | 2/2011 | Yoshikane et al. |

(Continued)

*Primary Examiner* — Jared Fureman
*Assistant Examiner* — Michael J Warmflash
(74) *Attorney, Agent, or Firm* — Peter L. Brewer; Thrive IP

(57) ABSTRACT

A hybrid energy storage device is provided. The energy storage device represents a combined capacitor and battery in modular form. The capacitor and the battery may be individually selected based on application needs, and then mechanically combined into a single electrical energy storage device. A method of forming a charge storage device is also provided herein. The method includes selecting a size for a capacitor, and selecting a size for a battery. A module for the capacitor having the selected size and a separate module for the battery having the selected size are then mechanically and electrically connected to form an integral energy storage device.

30 Claims, 7 Drawing Sheets

(56) References Cited

U.S. PATENT DOCUMENTS

| | | |
|---|---|---|
| 8,264,333 B2 | 9/2012 | Blaker et al. |
| 8,305,733 B2 | 11/2012 | Chan et al. |
| 8,379,367 B2 | 2/2013 | Oh et al. |
| 8,792,224 B2 | 7/2014 | Kim et al. |
| 9,272,627 B2 | 3/2016 | Miller |
| 9,300,018 B2* | 3/2016 | Watson ............... B60L 58/15 |
| 9,627,908 B2* | 4/2017 | Kaminsky ............ H01G 11/08 |
| D792,847 S | 7/2017 | Stone et al. |
| 9,803,609 B2 | 10/2017 | Setterberg et al. |
| 9,911,541 B2 | 3/2018 | Wang et al. |
| 9,991,060 B2 | 6/2018 | Bouchard et al. |
| 10,153,096 B2 | 12/2018 | Xi et al. |
| 10,158,152 B2* | 12/2018 | Watson ............... B60L 50/40 |
| D840,340 S | 2/2019 | Suszko et al. |
| 2006/0005739 A1* | 1/2006 | Kumar ................. B60L 9/16 105/35 |
| 2007/0047100 A1* | 3/2007 | Takahashi ............ H02J 9/061 359/689 |
| 2008/0268330 A1* | 10/2008 | Hansen ............... H01M 10/02 429/97 |
| 2009/0091291 A1* | 4/2009 | Woody ................. B60L 50/62 320/109 |
| 2010/0079109 A1* | 4/2010 | Eilertsen ............. H02J 3/32 320/127 |
| 2011/0288738 A1* | 11/2011 | Donnelly ............ F02D 19/0665 701/99 |
| 2012/0235473 A1* | 9/2012 | Jiang ................... H01M 50/20 307/9.1 |
| 2012/0301750 A1* | 11/2012 | Reis .................... H01M 16/00 429/7 |
| 2013/0264875 A1* | 10/2013 | Kaminsky ........... H02J 2207/20 307/52 |
| 2013/0266826 A1* | 10/2013 | Cowperthwaite ..... H01M 50/10 429/7 |
| 2014/0136055 A1 | 5/2014 | Sugiyama et al. |
| 2016/0176298 A1 | 6/2016 | Watson et al. |
| 2016/0327007 A1* | 11/2016 | Averbukh ............ F02N 11/10 |
| 2017/0129514 A1* | 5/2017 | Shubs, Jr. ............ B61L 27/04 |
| 2017/0194903 A1* | 7/2017 | Herbert ............... H01M 4/5825 |
| 2018/0013112 A1* | 1/2018 | Cameron ............. H01M 10/30 |
| 2020/0127479 A1* | 4/2020 | Johnson ............. H01M 10/4264 |

* cited by examiner

HYBRID ENERGY STORAGE DEVICE

STATEMENT OF RELATED APPLICATIONS

This application claims the benefit of U.S. Ser. No. 62/747,902 filed Oct. 19, 2018. That application is entitled "Hybrid Energy Storage Device" and is incorporated herein in its entirety by reference.

This application also claims the benefit of U.S. Ser. No. 62/753,241 filed Oct. 31, 2018. That application is entitled "Hybrid Energy Storage Device" and is also incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce selected aspects of the art, which may be associated with various embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Field of the Invention

The present disclosure relates to the field of power generation for mobile units. More specifically, the present invention relates to a modular hybrid super-capacitor and battery used for starting a mobile unit and for providing power to electronics for power sports.

Discussion of Technology

Batteries and capacitors are both used for storing electrical charge. However, they operate in very different ways.

Batteries utilize two electrical terminals, referred to as "electrodes." The electrodes are separated by a chemical substance called an electrolyte. Electrical energy is released in response to a chemical reaction involving the electrodes and the electrolyte. Once the chemicals have been depleted, the reactions stop and the battery is no longer able to provide a charge.

Some batteries are rechargeable. A well-known example is the lithium-ion power pack used for laptop computers and small, portable electronic devices. In these batteries, the electricity-inducing reactions run between the terminals in either direction. The result is that the battery can be charged and discharged and re-charged hundreds of times before replacing.

Batteries are frequently used in cars, trucks, boats, jet skis and other mobile units as a way of providing the initial starting charge for an internal combustion engine. For electrical cars and motorcycles, batteries provide ongoing power to turn a shaft and to power electrical devices (such as a radio or sensor). Beneficially, electric motors have a much broader torque curve than internal combustion engines, and produce 100% of their torque at 0 RPM's. Electric motorcycles can operate without a transmission and electric automobiles can operate with only a single speed gear box.

Batteries can also be used to provide power for portable refrigeration units such as those found in rail cars and over-the-road trailers. The larger the charge that is needed, the larger the battery (measured in kilo-watts).

Depending on size, batteries can hold large amounts of power. At the same time, they can take many hours to re-charge. For example, batteries used for electric motorcycles typically take 4 to 7 hours to re-charge.

Capacitors, on the other hand, can be charged almost instantly. Capacitors weigh less than batteries and typically do not contain chemicals or toxic metals. The downside though is that capacitors can store only small amounts of power.

Capacitors use static electricity (or electrostatics) rather than chemistry to store energy. A capacitor utilizes two opposing conducting metal plates with an insulating material there between. The insulating material is referred to as a dielectric. Positive and negative electrical charges build up on the plates, preventing them from coming into contact. The dielectric allows a capacitor of a certain size to store more charge at the same voltage.

Some capacitators are referred to as super-capacitors. A super-capacitor (or ultra-capacitor) differs from an ordinary capacitor in that its plates effectively have a much bigger surface area and the distance between them is much smaller. In the case of a super-capacitor, the plates are made from a metal coated with a porous substance such as powdery, activated charcoal. The porosity provides the greater surface area for storing more charge, providing more Farads. Also of interest, in a super-capacitor there is no dielectric material per se; instead, both plates are soaked in an electrolyte and separated by a very thin insulator.

When the plates are charged, an opposite charge forms on either side of the separator, creating what is called an electric double-layer. The double-layer is extremely thin, perhaps only one molecule thick (compared to a dielectric that might range in thickness from a few microns to a millimeter or more in a conventional capacitor). For this reason, super-capacitors are sometimes referred to as double-layer capacitors, or electric double-layer capacitors ("EDLC's").

The capacitance of a capacitor increases as the area of the opposing plates increases and also as the distance between the plates decreases. Capacitors have many advantages over batteries. As noted above, they generally weigh less. They can also be charged and discharged hundreds of thousands of times without wearing out. However, by design they are unable to store a charge as do batteries.

Super-capacitors are ideal for providing an initial charge for an internal combustion engine. For example, a super-capacitor may be used to provide a charge for the starter on an ICE motorcycle. A small battery may be separately provided to power up the capacitor for its one-time charge.

The expanding market of portable electronic devices and, especially, the emergence of electric vehicles and hybrid electric vehicles, has created increasing demand for energy devices. Different applications will require different combinations of capacitor and battery. Currently, companies offer numerous combined capacitor and battery units to meet these different applications. However, the battery and the capacitor are sold to the customer and installed as singular units, requiring the supplier or distributor to carry numerous units meeting different energy requirements.

Therefore, a need exists for a modular system wherein different sizes of capacitors (including super-capacitors) may be mechanically and electrically connected to different sizes of batteries, depending on the application. Further, a need exists for a method of combining super-capacitors and batteries for specific customer needs using interchangeable modules.

SUMMARY OF THE INVENTION

A hybrid energy storage device is first provided herein. The energy storage device represents a combined capacitor and battery in modular form. The capacitor and the battery may be individually selected based on application needs, and then mechanically combined into a single electrical energy storage device.

The energy storage device first comprises a first module, which represents a capacitor. The energy storage device also includes a second module, which represents a battery. The capacitor has an electrical connector dimensioned and arranged to mate with a corresponding electrical connector on the battery.

The first module and the second module are designed to be mechanically connected to form the single energy storage device. This may be done in one embodiment by mechanically mating the first module with the second module using male and female connector portions.

The first and second modules are further designed to be placed in electrical communication. The electrical connector of the capacitor mechanically and electrically mates with the electrical connector of the battery. Thus, when the modules are mechanically connected, the electrical connector of the capacitor is placed in electrical communication with the electrical connector of the battery.

The hybrid energy storage device may also include a threaded connector. The threaded connector is used to secure the two modules by connecting the male and female connector portions.

In one embodiment, a male connector portion extends from a top and side surface of the capacitor, while a female connector portion resides along a top and side of the battery. The female portion is dimensioned to closely receive the male portion. Each of the female and male portions has a through-opening configured to align and to receive the threaded connector when the male portion receives the female portion.

In an alternate embodiment, the male connector portion extends from a top and side surface of the battery, and the female connector portion resides along a top and side of the capacitor. The female portion is again dimensioned to closely receive the male portion. Each of the female and male portions has a through-opening configured to align and to receive the threaded connector when the male portion receives the female portion.

A method of forming a charge storage device is also provided. In one aspect, the method first comprises selecting a size for a capacitor. In this instance, "size" refers to capacitance, or storage potential. This is typically measured in Farads. The method then includes providing a capacitor having the selected size.

The method also comprises selecting a size for a battery. In this instance, "size" refers to electrical energy. Size may be measured in voltage and/or amps. More preferably, size refers to kilo-watt hours for a battery. The method then further includes providing a battery having the selected size.

In the method, the capacitor resides within a first module. The first module has a mechanical connector portion and an electrical connector. At the same time, the battery resides within a second module. The second module also has a mechanical connector portion and an electrical connector.

The method additionally includes mechanically connecting the first module and the second module. The first module and the second module are designed to be mechanically connected to form the single energy storage device. This may be done in one embodiment by mechanically mating the first module with the second module using the mechanical connector of the capacitor as a male portion, and the mechanical connector of the battery as a female portion.

At the same time, the electrical connector of the capacitor mates with the electrical connector of the battery, providing both a mechanical and electrical connection through male-female connectors. When the modules are connected, the capacitor is placed in electrical communication with the battery forming a hybrid electrical energy storage device.

The hybrid energy storage device may also include a threaded connector. The threaded connector is used to connect the male and female connector portions. Thus, the method may additionally include further connecting the respective male and female portions using one or more threaded connectors.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Figure 1:
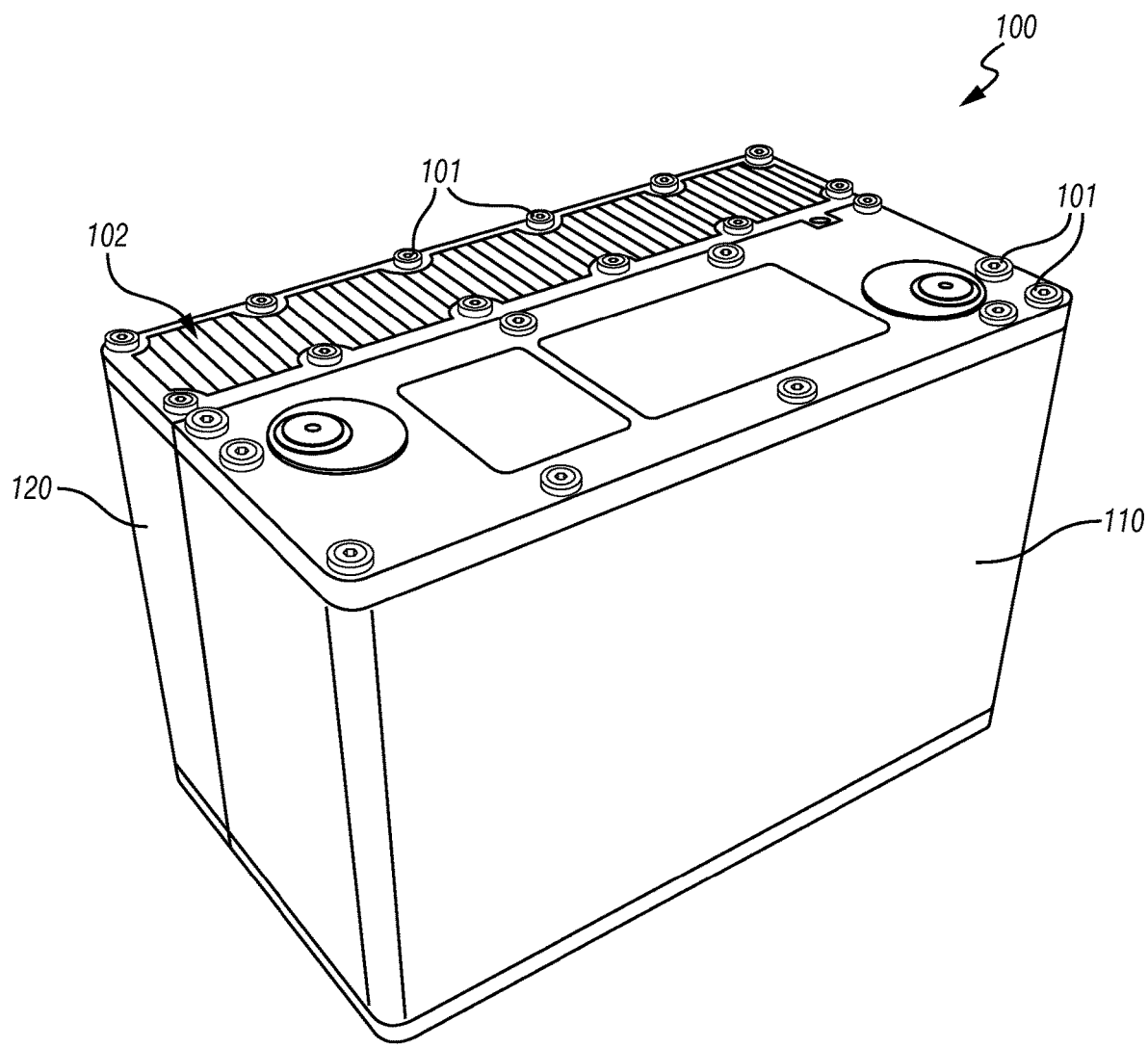
FIG. 1 is a perspective view of a hybrid energy storage device of the present invention, in one embodiment. The energy storage device represents a combined capacitor and battery, wherein each of the capacitor and battery reside in their own separate module.

FIG. 1 is a perspective view of a hybrid energy storage device 100 of the present invention, in one embodiment. The energy storage device 100 represents a combined battery 110 and capacitor 120, wherein each of the battery 110 and capacitor 120 reside in their own separate module.

In the view of FIG. 1, the battery 110 and the capacitor 120 have been connected, forming a single energy storage device 100. A plurality of bolts 101 are shown securing a cover 102 to the device 100. In actuality, the cover 102 is a pair of separate covers (presented as 112 and 122 in FIGS. 2 and 3) residing together over respective modules 110, 120.

Figure 2:
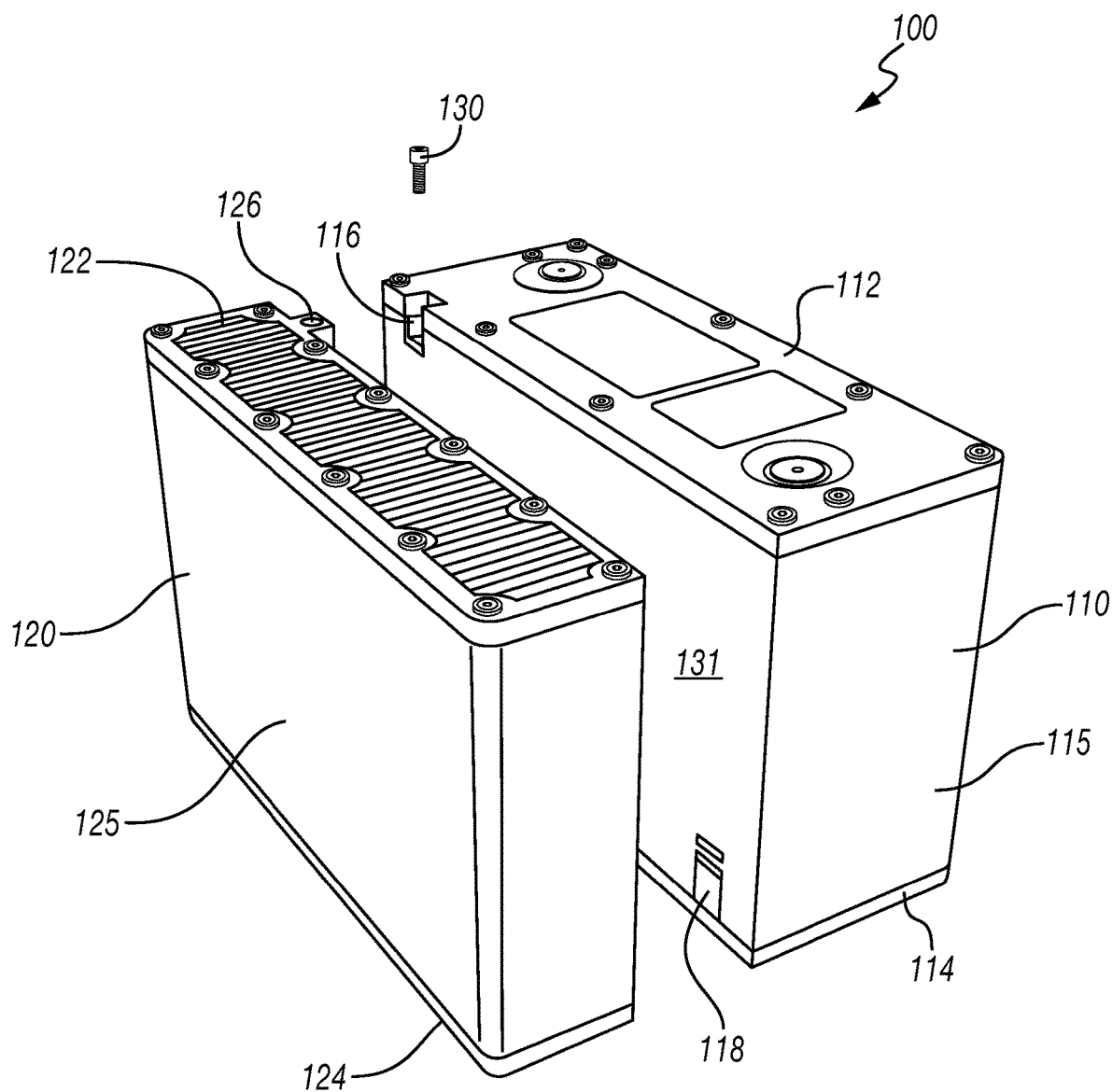
FIG. 2 is an exploded perspective view of the hybrid energy storage device of FIG. 1. Here, the capacitor is separated from the battery. Similarly, a threaded connector is exploded away from male and female mating portions.
Figure 3:
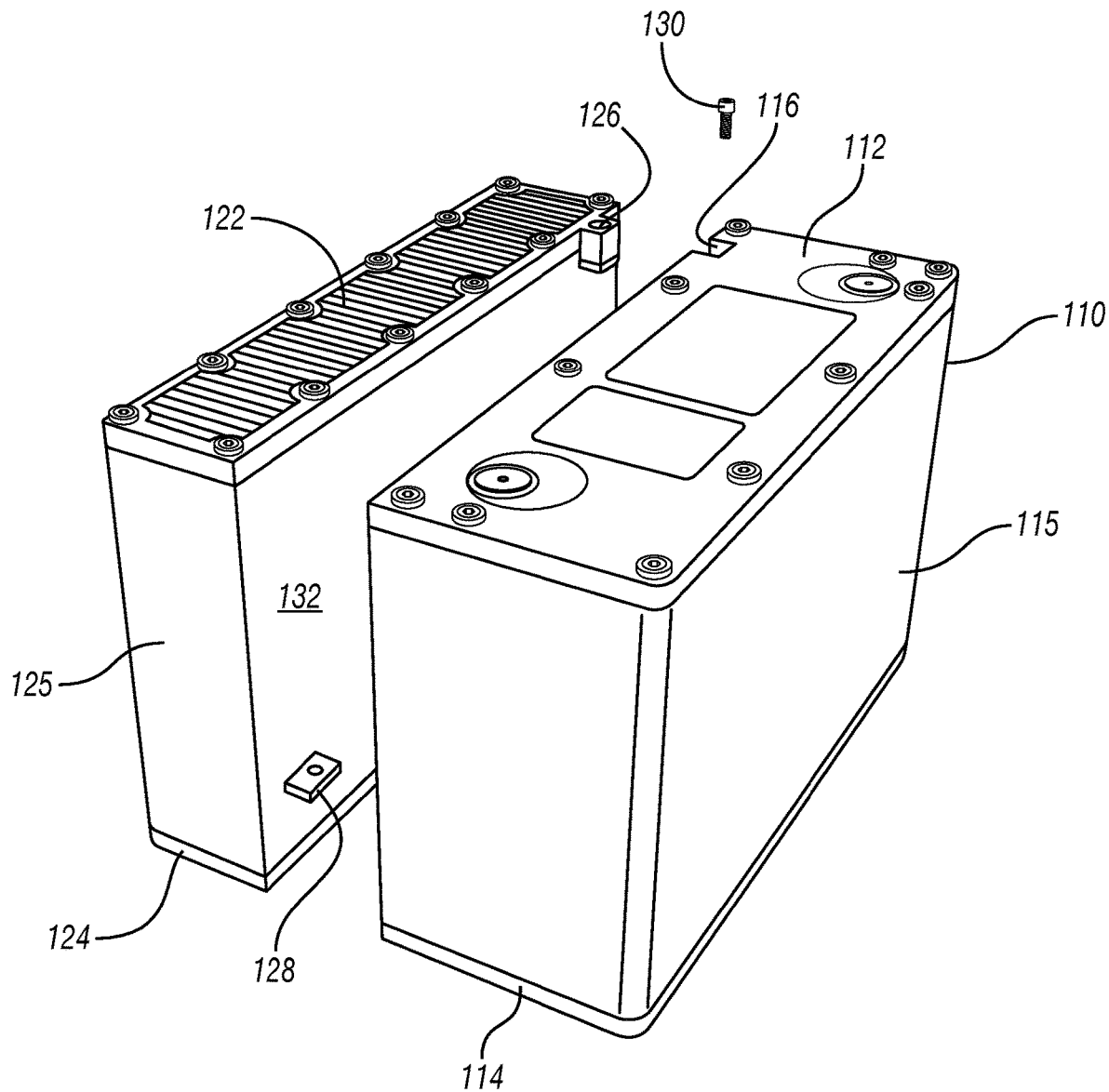
FIG. 3 is another exploded perspective view of the hybrid energy storage device of FIG. 1, shown from a different angle.

FIG. 2 is an exploded perspective view of the hybrid energy storage device 100 of FIG. 1. Here, the capacitor 120 is separated from the battery 110. FIG. 3 is another exploded perspective view of the hybrid energy storage device 100 of FIG. 1. In this figure the separated capacitor 120 and battery 110 are shown from a different angle.

As can be seen from FIGS. 1 through 3, the battery 110 comprises a body 115 having a polygonal profile. The body 115 has a top cover 112 and a base 114. The body 115 comprises a female connector portion 116 on one side 131. In this arrangement, the connector portion 116 defines a recessed portion of the body 115. The body 115 further includes a female electrical connector 118 on the same side 131.

The capacitor 120 also comprises a body 125 having a polygonal profile. The body 125 too has a top cover 122 and a base 124. The body 125 comprises a male connector portion 126 on one side 132. The body 125 further includes a male electrical connector 128 on the same side 132.

As demonstrated in FIG. 1, the battery 110 and the capacitor 120 are configured to be joined together to form a single energy storage device 100. Joining the modules 110, 120 involves placing the side 131 of the battery 110 adjacent the side 132 of the capacitor 120. The two bodies 115, 125 are pushed together so that the male connector portion 126 of the capacitor 120 is received by the female connector portion 116 of the battery 110. At the same time, the male electrical connector 128 of the capacitor 120 is received by the female electrical connector 118 of the battery 110.

To maintain the two bodies 115, 125 as a singular device 100, one or more threaded connectors may be used. In the arrangement of FIGS. 2, and 3, a threaded connector 130 is exploded away from male 126 and female 116 mating portions for illustrative purposes. The male 126 and female 116 mating portions are configured to receive the threaded connector 130 together.

Figure 4A:
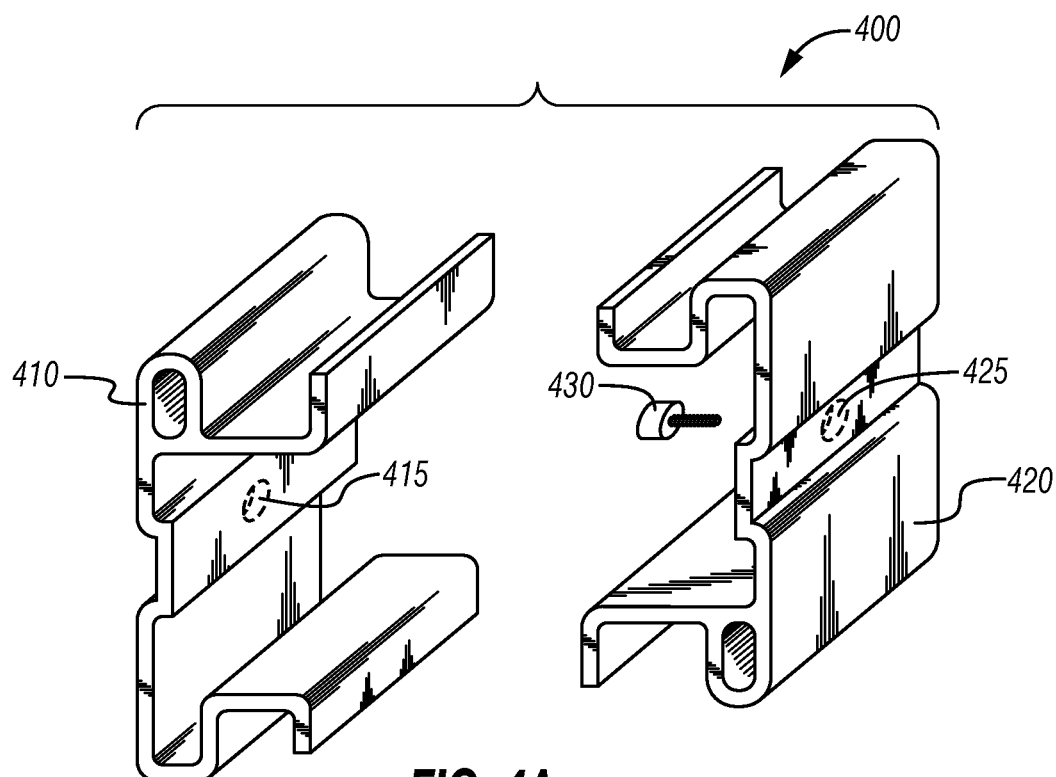
FIG. 4A is a perspective view of an optional connector system for connecting the capacitor and the battery of FIGS. 2 and 3. Here, clips of the connector system are exploded apart for illustrative purposes.

In an alternate, optional arrangement, the battery 110 and the capacitor 120 may be mechanically connected using mating clips. FIG. 4A is a perspective view of an optional connector system 400 for connecting the battery 110 and the capacitor 120 of FIGS. 2 and 3. The connector system 400 employs a first clip 410 and a second clip 420. In this illustrative arrangement, each clip 410, 420 is a mirror image of the other.

The clip 410 is designed to be connected to a side (such as side 131) of the battery 110. This connection may be made through an integral plastic injection molding of the body 115, or it may be secured using a threaded connector 430.

Similarly, the clip 420 is designed to be connected to a side (such as side 132) of the capacitor 120. This connection too may be made through an integral plastic injection molding of the body 125, or it may be secured using a threaded connector such as connector 430.

Figure 4B:
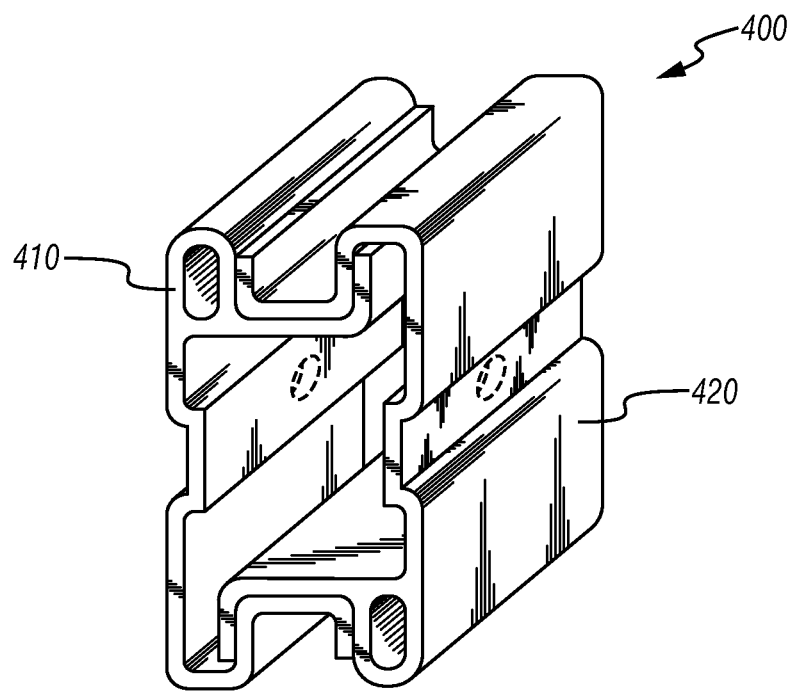
FIG. 4B is another perspective view of the connector system of FIG. 4A. Here, the clips have been mechanically connected.

In the view of FIG. 4A, the clips 410, 420 are in exploded apart relation for illustrative purposes. FIG. 4B is another perspective view of the connector system 400 of FIG. 4A. Here, the clips 410, 420 have been mechanically connected. This has been done by interlocking the clips 410, 420 together. Of interest, the clips 410, 420 are self-interlocking through the use of gravity and the mirrored configuration.

It is observed that the connector system 400 is merely illustrative. Other clip or other connector arrangements may be used. If clips are used, then the electrical connectors 118, 128 may need to be reconfigured such as by extending their lengths.

For purposes of the energy storage device 100, it is preferred that the device 100 offers high energy, high power densities and long cycling life. The battery 110 is preferably a lithium-ion battery (or "LIB") while the capacitor 120 is preferably a supercapacitor (or "SC").

It is understood that LIB's can deliver high energy densities (150-250 Watt-hours/kg) by utilizing Faradaic reactions throughout the active materials comprising the batteries. However, this mechanism may lead to low power densities (<1,000 Watts/kg) since solid-state ion diffusion in bulk electrodes is generally slow. LIB's may also suffer from short cycling lives (<1,000 cycles) due to degradation of material structures.

On the opposite extreme, SC's typically offer high power densities (about 1,000 to 10,000 Watts/kg) because of the fast physical sorption rates of charges on the surfaces of active materials comprising the capacitors. This mechanism may also enable long cycling lives (>100,000 cycles) because it generally does not cause major structural changes. However, as only the surface is typically utilized, the energy densities of SC's are very limited (e.g., 5-10 Wh/kg).

Hybrid supercapacitors (or supercapacitor-battery hybrid energy storage systems) have been proposed as a way to incorporate the advantages of both LIB's and SC's into one system. Existing supercapacitor systems consist of SC electrodes (activated carbon) as cathodes to ensure high power density through adsorption/desorption of anions, and LIB electrodes as anodes to provide high energy density by lithium (Li) insertion/extraction in a non-aqueous electrolyte. However, as noted above, such energy storage systems are manufactured and supplied as single products. This requires the distributor to stock multiple SKU's to meet a variety of applications, that is, multiple modules having various combinations of LIB and SC components within the housing.

It is proposed herein to provide the LIB and the SC components in modular form. By providing the LIB and the SC in modular form, the distributor is able to carry a much smaller inventory while meeting the needs of all applications. All that is required is for the distributor to select the desired battery and capacitor combination and connect them together to form a single power module.

Figure 5A:
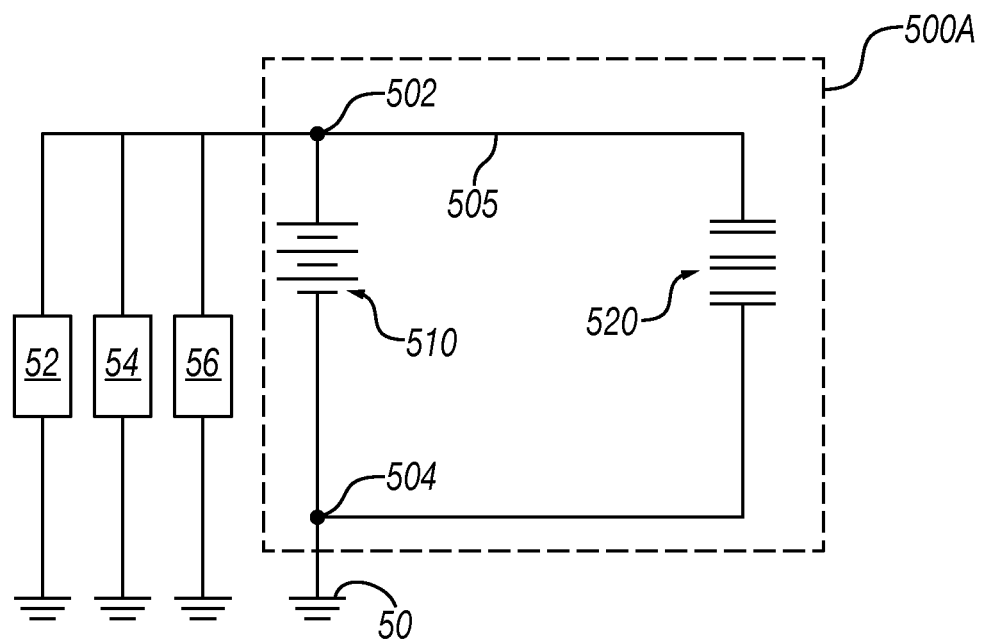
FIG. 5A is circuit diagram showing placement of the energy storage device into an electrical system, in a first embodiment.

FIG. 5A is circuit diagram showing placement of the energy storage device 100 into an electrical system 500A, in a first embodiment. The electrical system 500A may be an automobile, a truck, a refrigeration system, or any other system requiring electrical energy to run.

In the arrangement of FIG. 5A, the circuit diagram includes circuitry 505. The circuitry 505 includes two external terminals 502, 504. Terminal 502 represents a positive terminal while terminal 504 represents a negative or ground terminal (indicated at 50). The two-terminal energy storage device 100 can be configured to replace a standard two-terminal OEM battery.

A battery 510 is shown connected between terminals 502 and 504. Also, a capacitor 520 is shown connected between terminals 502 and 504. The battery 510 and the capacitor 520 are placed in parallel.

When used with an automobile or truck or motorcycle, the energy storage device 100 can be electrically connected to one or more vehicle loads. For example, the device 100 can be connected to a starter 52 or other car load 56. The device 100 can also be connected to a power supply 54 used to charge the device 100 as the vehicle is being driven. The power supply 54 may be, for example, an alternator. Other power supplies can be implemented instead of or in addition to alternator 54 such as a charging station for an electric or hybrid vehicle.

Embodiments of the device 100 allow both the battery 510 and the capacitor 520 to be charged from a power supply, such as the alternator 54, and also supply power to a vehicle system, such as the starter 52. In a preferred vehicle application, both the battery 510 and the capacitor 520 are charged from the alternator 54 with a charge voltage.

Those of ordinary skill in the art will understand that the battery 510 will maintain a high state of charge while connected to the alternator 54 or other power supply. Upon being disconnected from the power supply, the state of charge of the battery 510 will begin to dissipate. Voltage drops in the battery 510 can reduce the battery's life, preventing the battery 510 from providing a reliable starter crank.

Providing a capacitor 520 in parallel with the battery 510 allows the capacitor 520 to mitigate against starter crank problems. The circuitry 505 of FIG. 5A allows a bi-directional flow between the battery 510 and the capacitor 520. This provides a system wherein the capacitor 520 is configured to "re-charge" the battery 510 when the state of charge and voltage in the capacitor 520 is higher than the battery 510. The increased cycle efficiency of the capacitor 520 can also allow the capacitor 520 to increase the life of the battery 510. In addition, the efficient charge acceptance and discharge rate of the capacitor 520 can allow the capacitor 520 to mitigate some of the spikes and drops in power typical during operation of the device 100, such as during cranking.

Of interest, any current supplied to the vehicle starter 52 from the storage device 100 during a vehicle start event will be generated proportionally from both the battery 510 and the capacitor 520. Additionally, because current can flow between the capacitor 520 and the battery 510, the available charge and voltage of the capacitor 520 will also generally move towards a charge and voltage equilibrium relative to that of the battery 510 when the alternator 54 (or other power source) is in an "off" state. Such voltage equilibrium may generally be less than the state of charge and voltage of the capacitor 520 if it were to be electrically isolated from the battery 510.

Figure 5B:
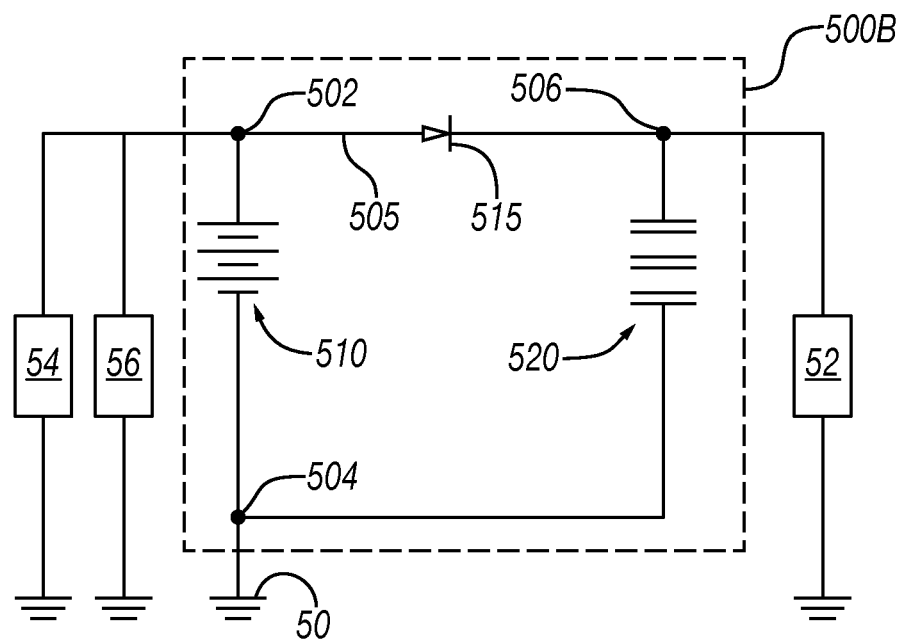
FIG. 5B is circuit diagram showing placement of the energy storage device into an electrical system, in a second embodiment.

FIG. 5B is circuit diagram showing placement of the energy storage device 100 into an electrical system 500B, in a second embodiment. The electrical system 500B is generally similar to the electrical system 500A described above. However, in this instance a third terminal 506 is provided as part of the circuitry 505.

In the circuitry arrangement of FIG. 5B, terminal 502 comprises a first positive terminal. This terminal 502 is connect with the alternator 54. Terminal 506 comprises a second positive terminal that is connected with the starter 502. This arrangement allows the starter 52 to be electrically configured on the same terminal of the device 100 as, for example, the capacitor 520. Additionally, the alternator 54 may be electrically connected with the same terminal as the battery 510.

In FIG. 5B, a rectifier 515 is positioned between the alternator terminal 502 and the starter terminal 506. The rectifier 515 may comprise, for example, a diode, a synchronous rectifier, or a transistor. The rectifier 515 allows current flow from the alternator 52 to the capacitor 520, allowing the capacitor 520 to be charged while preventing or reducing current flow from the capacitor 520 to terminal 502 and battery 510. Such an embodiment can at least partially electrically isolate the capacitor 520 from the battery 510.

The three-terminal circuitry 505 of FIG. 5B isolates the capacitor 520 from the battery 510 by allowing only uni-directional current flow. Such an arrangement has the benefit of allowing only the power and current stored in the capacitor 520 to be provided to the starter 52 during a start event. This also allows the capacitor 520 to supply power to high power pulse devices, such as the starter 52, allowing the battery 510 to contribute power to devices with medium or longer period demands.

In operation, the battery 510 may sometimes have an undesirable lower voltage because the battery has been accidently discharged, or has been insufficiently re-charged (such as during a start/stop event), or has been operating in a cold environment. By at least partially isolating the battery 510 and the capacitor 520 by using the rectifier 515 in a three-terminal system, the capacitor 520 can remain at a higher voltage and state of charge when the alternator 54 or other power supply is turned off, separate from the state of charge, voltage and capacity of the battery 510. Such isolation thus can also provide an overall higher energy to the starter 52 from the capacitor 520, without the limiting effects of the battery 510.

In any instance, upon assembly, the energy storage device 100 will include a positive device terminal (such as terminal 502) and a negative device terminal (such as terminal 504). The energy storage device 100 includes a battery 510 connected between the first terminal 502 and the second terminal 504. The energy storage device includes a capacitor 520 connected in parallel with the battery 510. In one optional embodiment, the energy storage device 100 includes a rectifier 515 connected between the first terminal 502 and the capacitor 520. As noted, the rectifier 515 is configured to allow substantially uni-directional current flow from the first terminal 502 to the capacitor 520. In either arrangement no switch is required or used for controlling electrical communication between the capacitor and the first terminal.

It is noted that in an alternative arrangement, a second battery may be used as part of the circuitry 515. In this arrangement, the second battery is connected in parallel with and between the first battery 510 and the capacitor 520. A first rectifier is connected in parallel with and between the first battery and the second battery, while a second rectifier is connected between the second terminal and the first rectifier. Yet a third rectifier may be connected between the first rectifier and the first terminal.

Returning to FIGS. 2 and 3, it is preferred that the body 115 for the battery 110 and the body 125 for the capacitor 120 each define a separate housing. The housings form independent "modules" for the battery 110 and for the capacitor 120. When mechanically secured together and placed in electrical communication, the battery 110 and the capacitor 120 together form an energy storage device 100 in modular form.

Additional features may be included with the energy storage device 100. For example, the energy storage device 100 may comprise a sensor. The sensor senses the internal resistance of the battery 110. This enables a user to determine the condition of the battery 110. Those of ordinary skill in the art will understand that when a battery sits idle, a chemical reaction can take place in the cells that causes copper sulfate to build up on the battery terminals. This, in turn, rapidly increases the internal resistance of the battery, reducing its ability to generate the charge needed to crank an engine.

The energy storage device 100 may further include a micro-controller. The micro-controller receives signals from the sensor that are indicative of internal resistance. Using a transceiver, the micro-controller then sends the signals to a computer (which may be a network server or may be an application running on a portable communications device, or both). Signals are sent using a wireless communications system.

The signals are processed by the computer such that a remote operator is able to review the signals and determine the status of the battery in real time. In addition, the micro-controller may have a GPS module. In this instance, the micro-controller sends signals indicative of GPS coordinates. In this way, the operator may determine a location of the energy storage device 100 at any given moment. This is of particular importance when the operator is monitoring the condition of a battery associated with a rail car or other moving (or moveable) object remote from a service center.

The energy storage device 100 is intended to provide electrical power for a mechanical object. For example, the energy storage may provide electrical energy to a starter for a car or a boat. In the present inventions, the mechanical object may be a car, a truck or a marine vessel. Alternatively, the mechanical device may be a jet ski or a so-called four-wheeler. Alternatively still, the mechanical device may be an air conditioning unit used for a refrigeration truck or for a rail car.

Figure 6A:
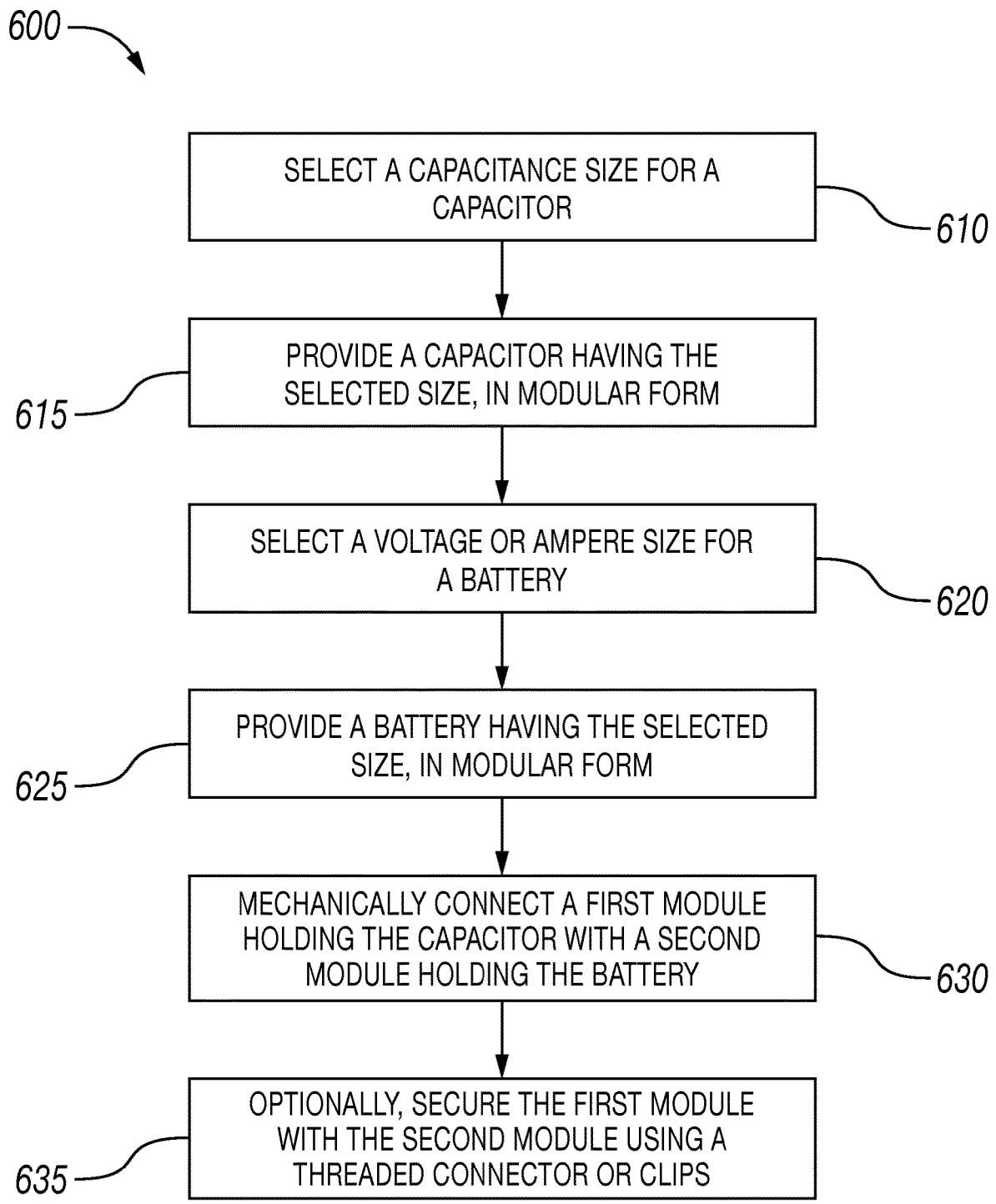
FIGS. 6A and 6B represent a single flow chart showing steps for performing the method of forming a charge storage device, in one embodiment.
Figure 6B:
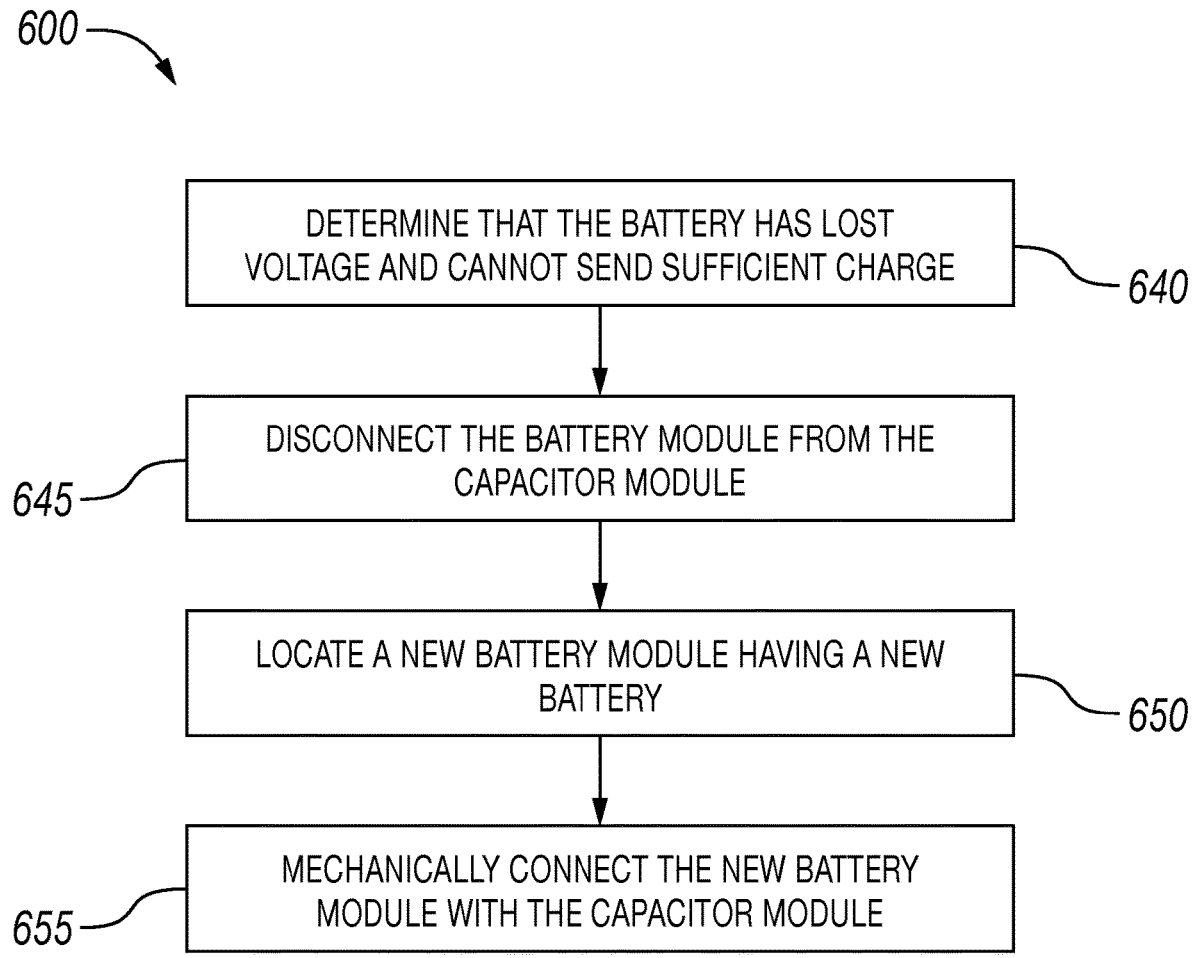

Using the energy storage device 100, a method of forming a charge storage device is provided herein. FIGS. 6A and 6B present a flow chart showing steps for a method 600 of forming a charge storage device, in one embodiment.

In one aspect, the method 600 first comprises selecting a size for a capacitor. This is shown in Box 610 of FIG. 6A. In this instance, "size" refers to capacitance, or storage potential. The method 600 then includes providing a capacitor having the selected size, in modular form. This is seen in Box 615. It is understood that the capacitor may be a bank of capacitors depending on the amount of stored electrical energy that is needed.

The method 600 also includes selecting a size for a battery. This is indicated in Box 620. Preferably, the battery is a lithium battery. The lithium battery may be a lithium-ion battery, a lithium-iron phosphate battery, a lithium-cobalt oxide battery, a lithium-nickel manganese cobalt oxide battery, a lithium-manganes oxide battery, a lithium titanate battery, or any other lithium battery suitable for providing electrical power to a mechanical device.

The method 600 then includes providing a battery having the selected size. This is provided in Box 625. Preferably, the battery is also in modular form.

In one embodiment of the method 600, the capacitor resides within a first module while the battery resides within a second module. The term "module" refers to an independent housing holding an electrical device. The first module has a mechanical connector portion and an electrical connector. Similarly, the second module has a mechanical connector portion and an electrical connector.

The method 600 additionally includes mechanically connecting the first module and the second module by connecting the mechanical portion of the battery to the mechanical portion of the capacitor. This is done while simultaneously connecting the electrical connector of the capacitor with the electrical connector of the battery. This is provided in Box 630.

Preferably, the electrical connector of the capacitor and the electrical connector of the battery are mated through a male-female connection, and with a threaded connector. This is shown in box 635. In any instance, the first module and the second module are combined to form a hybrid energy storage device. The hybrid energy storage device comprises a first device terminal and a second device terminal. The battery is connected between the first device terminal and the second device terminal, while the capacitor is connected in parallel with the battery.

In one embodiment, a rectifier is provided for the energy storage device. The rectifier is connected between the first device terminal and the capacitor. The rectifier is configured to provide uni-directional current flow from the first device terminal to the capacitor.

As an alternative to the rectifier, the energy storage device may include a current limiter. The current limiter is connected between the first device terminal and the capacitor and acts as a resistor. In this respect, the current limiter is configured to limit current flow from the first device terminal to the capacitor. In one function, the current limiter is configured to reduce current draw from the batter when the capacitor powers an external device. The current limiter may comprise at least one of a positive-temperature-coefficient resistor and a resistive bridge.

The current limiter is preferably used in lieu of the rectifier 515 in FIG. 5B. Alternatively, the current limiter may be connected in series between the rectifier and the capacitor.

It is observed that a battery 110 as could be used in the energy storage device 100 may only have up to 2,000 charge cycles. Further, the battery 110 may be susceptible to losing voltage if it is left unused for several weeks or if it is exposed to extreme cold temperatures. In such instances, the battery 110 (in its modular form) would have to be replaced even before it reaches 2,000 charge cycles.

At the same time, it is observed that a capacitor 120 as could be used in the energy storage device 100 may have up to one million charge cycles. Further, the capacitor 120 is virtually immune to the effects of cold at levels that are detrimental to a battery 110 and can store charge for off-peak hours. Thus, the capacitor 120 will far outlast the battery 110. Thus, as part of the method 600, steps may additionally be taken as follows:

determining that the battery has lost sufficient voltage to start an engine (or to charge the capacitor) [shown in Box 640 of FIG. 6B];
  disconnecting the first module from the second module [provided in Box 645];
  locating a new second module having a new battery, wherein the second module also has a mechanical connector portion and an electrical connector [indicated at Box 650]; and
  mechanically connecting the first module to the new second module while simultaneously connecting the electrical connector of the capacitor with the electrical connector of the new battery [seen in Box 655].

This allows a new charge storage device to be provided without throwing out the capacitor.

Further, uses and variations of the hybrid energy storage device may fall within the spirit of the claims, below. For example, in yet another alternative embodiment the battery and the capacitor are not separate modules, but instead each resides in the same housing. In this instance, mechanical connectors for the separate housings are not needed since the battery and the capacitor are already housed together.

In this arrangement, the housing will have a base, a removable top and a plurality of side walls. A user may access the electronics for the energy storage device by removing the top. In this instance, the "top" may represent covers 112, 122 as an integral piece.

As a part of the alternative method, a user may determine that the battery portion of an energy charge device has become depleted or is otherwise incapable of delivering sufficient voltage to cause the starter to crank the engine. This may be due to an inactive state of the engine for a period of time. For example, it is not uncommon for the battery of a jet ski or a motorcycle or a four-wheeler to "go dead" over the winter or otherwise if it is not activated at least every few weeks. Jet ski batteries are notorious for having to be replaced each spring after sitting idle for months, including during a cold winter.

When this occurs, the user need not replace the entire charge storage device; rather, the user may replace only the battery portion, or "lithium half" (assuming that the old battery portion cannot be re-charged). In this instance, the user removes the top from the housing, removes the battery from the housing, replaces the old battery with a new one, and then returns the top (or lid) to the housing of the charge storage device.

It will be appreciated that the inventions are susceptible to modification, variation and change without departing from the spirit thereof.

What is claimed is:

1. A hybrid capacitor and battery energy storage device, comprising:
   a first module representing a capacitor housing, and a capacitor residing within the capacitor housing, the first module having a mechanical connector portion and an electrical connector;
   a second module representing a battery housing, and a battery residing within the battery housing, the second module also having a mechanical connector portion and an electrical connector;
   wherein:
   the first module defines an interchangeable capacitor module having a selected capacitance value,
   the second module defines an interchangeable battery module having a selected kilo-watt hour value,
   the capacitor housing comprises a side wall;
   the battery housing also comprises a side wall;
   the electrical connector of the first module resides on the side wall of the capacitor housing;
   the electrical connector of the second module resides on the side wall of the battery housing;
   the mechanical connector portion of the first module and the mechanical connector portion of the second module represent a male-female connection provided on the adjacent side walls of the first module and the second module such that the first module and the second module may be mechanically connected to form a single energy storage device having a defined combined voltage; and
   the electrical connector of the first module and the electrical connector of the second module are mechanically connected through a male-female connection provided along the side walls of the first module and the second module when the side walls of the first module and the second module are placed in adjacent relation, by connecting the mechanical connector portion of the capacitor to the mechanical connector portion of the battery while connecting the electrical connector of the capacitor with the electrical connector of the battery.

2. The energy storage device of claim 1, further comprising:
   a first device terminal and a second device terminal, wherein:
   the battery is connected between the first device terminal and the second device terminal, and
   the capacitor is connected in parallel with the battery.

3. The energy storage device of claim 2, further comprising:
   a rectifier connected between the first device terminal and the capacitor, with the rectifier being configured to provide unidirectional current flow from the first device terminal to the capacitor.

4. The energy storage device of claim 3, further comprising:
   a third device terminal between the rectifier and the capacitor.

5. The energy storage device of claim 2, further comprising:
   a current limiter connected between the first device terminal and the capacitor, with the current limiter being configured to limit current flow from the first device terminal to the capacitor.

6. The energy storage device of claim 5, wherein the current limiter comprises at least one of a positive-temperature-coefficient resistor and a resistive bridge.

7. The energy storage device of claim 1, further comprising:
   a threaded connector for connecting the male and female connection portions.

8. The energy storage device of claim 2, wherein:
   male portion of the male-female connection extends from proximate a top of the side wall of the first module, and a female portion of the male-female connection resides proximate a top of the side wall of the second module;
   the female portion is dimensioned to closely receive the male portion; and
   each of the female and male portions have a through-opening configured to align and to receive the threaded connector when the male portion receives the female portion.

9. The energy storage device of claim 8, wherein:
   male portion of the male-female connection extends from proximate a top of the side wall of the second module, and a female portion of the male-female connection resides proximate a top of the side wall of the first module;
   the female portion is dimensioned to closely receive the male portion; and
   each of the female and male portions have a through-opening configured to align and to receive the threaded connector when the male portion receives the female portion.

10. The energy storage device of claim 2, wherein the capacitor is a super-capacitor.

11. The energy storage device of claim 2, configured such that the connection between the electrical connector of the first module and the electrical connector of the second module occurs simultaneously when making the connection between the mechanical connector of the first module and the second module.

12. The energy storage device of claim 2, further comprising:
   a sensor configured to sense internal resistance of the battery;
   a micro-controller residing on the second module, the micro-controller configured to receive signals sent by the sensor, and transmit those signals through a wireless communications system using a transceiver for remote processing or review.

13. The energy storage device of claim 12, further comprising:
a GPS module associated with the micro-controller, wherein the transceiver is further configured to transmit GPS coordinates through the wireless communications system.

14. The energy storage device of claim 2, further comprising:
a first clip connected to a side of the first module serving as the mechanical connector for the first module; and
a second clip connected to a side of the second module and serving as the mechanical connector for the second module;
wherein the first module and the second module are mechanically connected by interlocking the first clip with the second clip.

15. A method of forming a charge storage device, comprising:
providing an inventory of capacitor modules, wherein each capacitor module in the inventory comprises a capacitor housing, an electrical connector along a side wall of the capacitor housing, a mechanical connector portion also along the side wall of the capacitor housing, and a capacitor residing within the capacitor housing, and wherein the capacitor modules represent differing capacitance values but interchangeable capacitor housings;
providing an inventory of battery modules, wherein each battery module in the inventory comprises a battery housing, an electrical connector along a side wall of the battery housing, a mechanical connector portion also along the side wall of the battery housing, and a battery residing within the battery housing, and wherein the battery modules represent differing kilo-watt values but interchangeable battery housings;
selecting a capacitor module having a desired capacitance value from the inventory of capacitor modules;
selecting a battery module having a desired kilo-watt hour value from the inventory of battery modules; and
mechanically connecting the selected capacitor module to the selected battery module by connecting the mechanical connector portion of the battery module to the mechanical connector portion of the capacitor module while simultaneously connecting the electrical connector of the selected capacitor module with the electrical connector of the selected battery module;
and wherein the electrical connector of the selected capacitor module and the electrical connector of the selected battery module are mechanically connected through a male-female connection, placing the selected capacitor module and the battery module in side-by-side relation and forming a hybrid energy storage device having a selected voltage value.

16. The method of claim 15, wherein:
the battery of the selected battery module is a lithium-ion battery; and
the hybrid energy storage device further comprises a first device terminal and a second device terminal, wherein:
the battery is connected between the first device terminal and the second device terminal, and
the capacitor is connected in parallel with the battery.

17. The method of claim 16, wherein the hybrid energy storage device further comprises:

a rectifier connected between the first device terminal and the capacitor, with the rectifier being configured to provide unidirectional current flow from the first device terminal to the capacitor.

18. The method of claim 17, wherein the hybrid energy storage device further comprises:
a third device terminal between the rectifier and the capacitor.

19. The method of claim 16, wherein the hybrid energy storage device further comprises:
a current limiter connected between the first device terminal and the capacitor, with the current limiter being configured to limit current flow from the first device terminal to the capacitor.

20. The method of claim 19, wherein the current limiter comprises at least one of a positive-temperature-coefficient resistor and a resistive bridge.

21. The method of claim 19, wherein the mechanical connector portion of the capacitor and the mechanical connector portion of the selected battery module represent a male-female connection.

22. The method of claim 21, further comprising:
a threaded connector for connecting the male and female connector portions of the mechanical connector, forming a mechanical connection.

23. The method of claim 22, wherein:
male portion of the mechanical connection extends from proximate a top of the side wall of the housing of the selected capacitor module, and a female portion of the mechanical connection resides along a top of the side wall of the housing of the selected battery module;
the female portion of the mechanical connection is dimensioned to closely receive the male portion of the mechanical connection; and
each of the female and male portions of the mechanical connection has a through-opening configured to align and to receive the threaded connector when the male portion receives the female portion.

24. The method of claim 22, wherein:
a male portion of the mechanical connection extends from a top of the side wall of the housing of the battery module, and a female portion of the mechanical connection resides along a top of the side wall of the housing of the capacitor module;
the female portion of the mechanical connection is dimensioned to closely receive the male portion; and
each of the female and male portions of the mechanical connection have a through-opening configured to align and to receive the threaded connector when the male portion receives the female portion.

25. The method of claim 15, wherein the charge storage device is configured to provide electrical power to a mechanical object.

26. The method of claim 25, wherein the mechanical object is a car, a truck, a boat or a refrigeration unit on a trailer or rail car.

27. The method of claim 25, further comprising:
determining that the battery has lost voltage;
disconnecting the selected capacitor module from the selected battery module;
locating a replacement battery module from the inventory of battery modules; and
mechanically connecting the selected capacitor module to the replacement battery module in side-by-side relation by making the mechanical connection while simultaneously connecting the electrical connector of the selected capacitor module with the electrical connector of the replacement battery module to form a new hybrid energy storage device.

28. A method of maintaining a charge storage device for a refrigeration unit on a vehicle, the method comprising:

providing a charge storage device for the refrigeration unit, the charge storage device having a capacitor and a first battery residing within a housing, and wherein:

the housing of the charge storage device has a base, a top, and side walls, the capacitor comprises a housing having a side wall, and an electrical connector along the side wall of the capacitor, the first battery comprises a housing also having a side wall, and an electrical connector along the side wall of the first battery, with the electrical connector of the capacitor and the electrical connector of the battery forming a male-female connection;

determining that the first battery has lost voltage;

removing the first battery from the housing of the charge storage device;

installing a new second battery to replace the first battery, the second battery also comprising a housing having a side wall, and an electrical connector along the side wall of the second battery; and using the charge storage device to provide power to the refrigeration unit;

and wherein:

removing the first battery from the housing comprises removing the top from the housing;

installing the second battery comprises placing the second battery in side-by-side relation to the capacitor, while simultaneously placing the second battery in electrical communication with the capacitor using the male-female connection;

the method also comprises replacing the top onto the housing after installing the second battery; and the side-by-side relation is effected by placing a surface area of the second battery against a surface area of the capacitor.

29. The method of claim 28, wherein:

the first battery and the second battery are each lithium-ion batteries; and the vehicle is a refrigerated rail car or refrigerated trailer for a truck.

30. The method of claim 29, wherein:

the first battery and the second battery have the same voltage specifications;

the capacitor further comprises a mechanical connector portion;

each of the first battery and the second battery comprises a mechanical connector portion configured to form a male-female mechanical connection; and placing the second battery in side-by-side relation to the capacitor comprises mechanically connecting the mechanical connector portion of the second battery to the mechanical connector portion of the capacitor as a male-female connection while simultaneously connecting the electrical connector of the capacitor with the electrical connector of the second battery module.

* * * * *